Feb. 20, 1968     A. ROUILLON     3,369,827

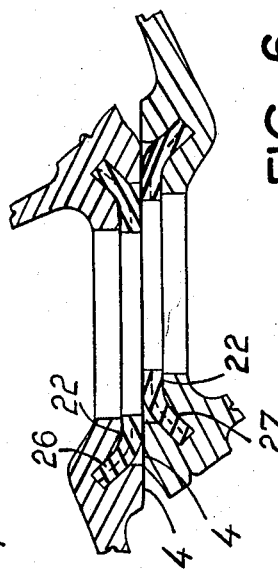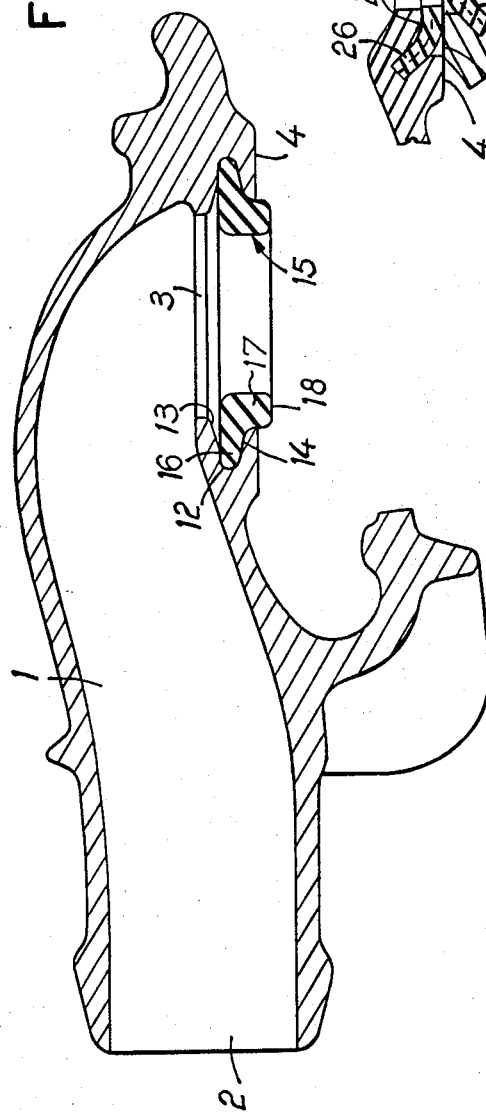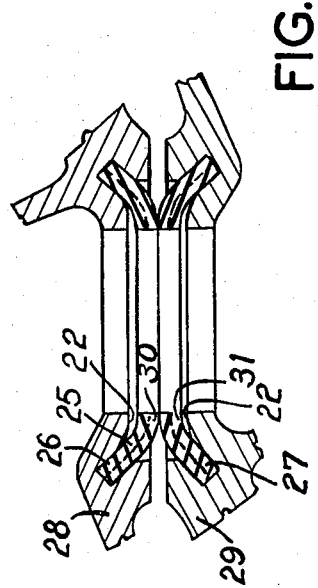

HOSE COUPLING FOR BRAKE PIPE OF RAILWAY VEHICLES

Filed Feb. 9, 1966     2 Sheets-Sheet 2

INVENTOR
ANDRE ROUILLON
BY Ralph W. McIntire Jr.
ATTORNEY

United States Patent Office 3,369,827
Patented Feb. 20, 1968

3,369,827
HOSE COUPLING FOR BRAKE PIPE OF RAILWAY VEHICLES
Andre Rouillon, Villemomble, France, assignor to Compagnie des Freins et Signaux Westinghouse, Paris, France
Filed Feb. 9, 1966, Ser. No. 526,278
Claims priority, application France, Feb. 16, 1965, 5,770
3 Claims. (Cl. 285—68)

ABSTRACT OF THE DISCLOSURE

A hose coupling head including a conical gasket disposed in a groove of corresponding shape, the gasket being flexible against a ledge recessed relative to the face portion of the head to facilitate a tight seal with a similar gasket in a similar head, and to facilitate pull-apart release of the heads without dislodging the gasket.

When it becomes necessary to couple cars into a railway train or to a tractor, or to detach certain of these cars from the train, it is necessary to couple or uncouple the brake pipe hose couplings. These hose coupling heads are normally coupled together by relative rotation to enable their coupling and mutual locking together and are normally separated or uncoupled by reverse rotation, as is well known.

The rotary action of coupling as mentioned above has another effect, that is, the mutual engagement and compressing of the coupling gaskets in the heads so as to effect an airtight coupling of the brake pipe.

One of the first desirable qualities of automatic braking is the safety that is afforded by this type of equipment, that is, in case of serious rupture of a hose between cars, fluid pressure is vented from the brake pipe effecting the immediate application of the brakes of the train, In any event, heretofore, when such rupturing occurred, the sealing gaskets were lost, thus requiring that repair of the hose or coupling be made by makeshift means in order for the train to proceed.

To correct this difficulty, it is known to provide a sealing gasket means between the two coupling heads in such manner that for recoupling the heads there is required a rotary motion between the coupling heads with a sufficient force to permit pull apart of the couplings without loss of the flexible seals. In this structure it is the unfortunate experience that the seal of the gaskets is not perfect and that leakage is produced which seriously handicaps the brake equipment and can cause halting of the train. Further, in case of rupture of the coupling, the coupling heads are pulled apart and the sealing gaskets are blown out and must be replaced.

The present invention has for its object improvement of the coupling heads of the second type, that is, those in which coupling is effected by mutual rotation and the uncoupling is accomplished by pull apart, these improvements being to provide in coupling heads of the second type the sealing qualities required in normal service, which qualities are characteristic of the coupling heads of the first type discussed above.

According to the invention, each coupling head includes interiorly of its brake pipe opening an annular groove in which is engaged by its edges a gasket of elastic material having an outer edge fitting in this groove and having at its exterior sealing face a form suitable on a pull-apart operation to effect sliding of this face over that of the gasket of the other head cooperatingly, the intermediate portion of said gasket bending with an elastic return.

In an especially advantageous embodiment, because it permits use of existing coupling heads, each gasket at rest has the form of a ring with an L-shaped cross section, one thin branch of which is engaged in part in the corresponding groove of the coupling head and with the other free branch, the thicker branch of the two branches, forming a throat extending concentrically with the axis of the brake pipe opening, the axis of this throat extending perpendicular to the mating face of the coupling head. The contact faces of the gaskets having an L-shaped cross section are convex.

In another embodiment, preferably to be used when replacing used material or for equipping a new installation, each gasket at rest has the form of a hollow truncated cone, its wide edge being engaged in a groove of the same shape in the corresponding coupling head, and its narrow edge extending into a hollowed out section in the coupling face of the head. The section of each coupling head adjacent the groove is provided for the lodgement of a gasket in the shape of a truncated cone to a depth substantially equal to the thickness of the adjoining part of the gasket.

The truncated gasket has, at rest, a uniform thickness and is of uniform generation. The truncated gasket is preferably reinforced by a fabric completely enclosed in the plastic material making up the gasket.

Several other objects and characteristics of the invention will become readily apparent in the following description taken in conjunction with the drawing, in which:

FIG. 1 is a longitudinal sectional view of a hose coupling head showing a first embodiment of the invention;

FIG. 5 is a partial sectional view of a pair of hose coupling heads as shown in FIG. 4 shown in a coupled potion; and FIG. 6 shows a view similar to that of FIG. 5 showing the heads in an intermediate stage of uncoupling by being pulled apart.

As is shown clearly by FIG. 1, each coupling head defines a curved internal passageway 1 normally connected at one of its ends 2 to the flexible brake pipe hose and terminating at its other end by a connecting port 3 onto the coupling face 4.

Figure 3:
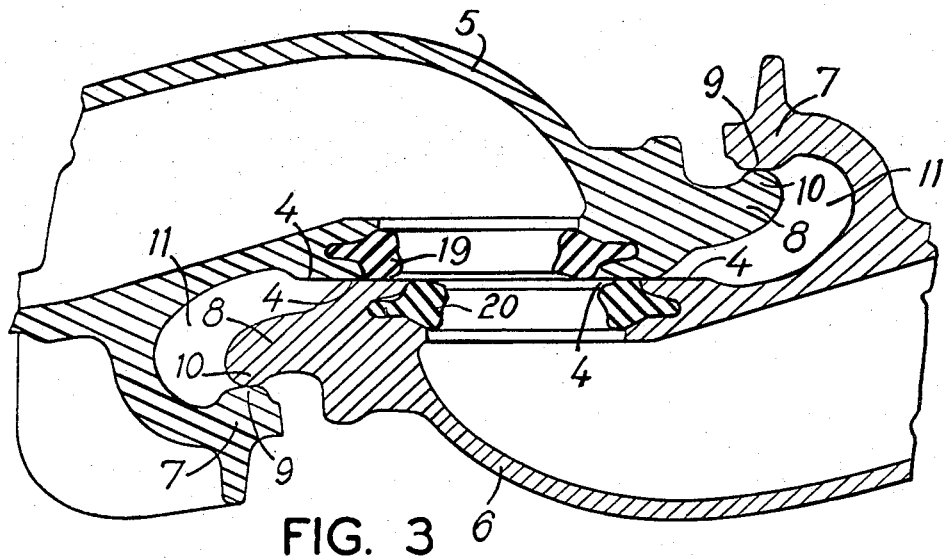
FIG. 3 is a view similar to FIG. 2, with the heads shown in an intermediate stage of uncoupling by being pulled apart.

Referring to FIG. 3, the coupling by rotation of two such coupling heads 5 and 6 is effected by two projecting lugs 7 and 8 on each head 5 and 6, having near the bosses 9 and 10 on each head a re-entering space 11 being provided between the lug 7 and the coupling face 4 for the passage of the lug 8 of the cooperating coupling head.

Figure 2:
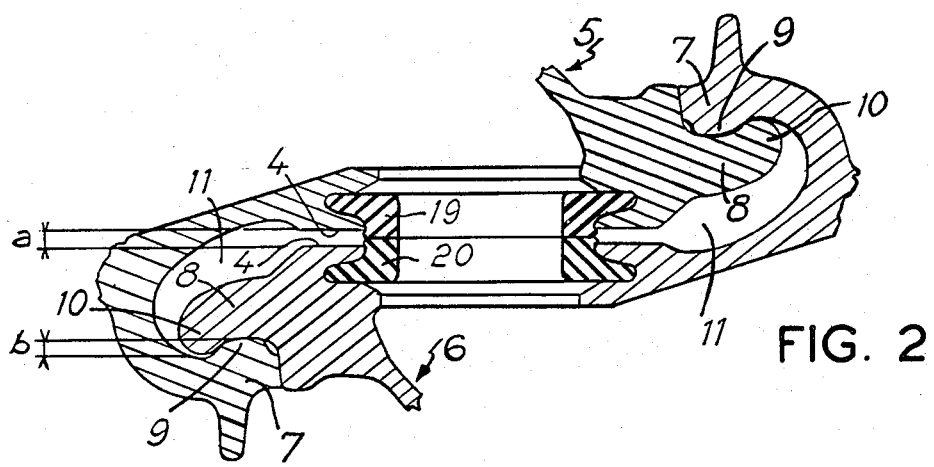
FIG. 2 is a partial sectional view of two coupling heads such as shown in FIG. 1 with the heads being shown in the coupled position.

Referring to FIG. 2, the configuration of the lugs 7 and 8 is such that the distance $a$ between the joining faces 4 of the two coupling heads 5 and 6 in the coupled position, in which these coupling heads are arranged symmetrically, is slightly greater than the distance $b$ existing in the same direction between the tops of the bosses 9 and 10, of these two coupler heads. By this structure, and also by reason of the bosses 9 and 10 being formed as inclined surfaces, the uncoupling operation resulting from the effect of a strong pulling force is made possible.

According to a first embodiment of the invention illustrated by the FIGURES 1 to 3, an annular groove 12, the axis of which is parallel to the junction face 4, is machined into each coupling head and opens into a passageway 3. The flange surfaces 13 and 14 of this annular groove are inclined and diverge toward this passageway.

A gasket 15 of elastic material, shown unstressed in FIG. 1, has an annular shape with an L-shaped cross section. The thinner arm 16 of this gasket is engaged by its peripheral edge into the groove 12, while the thicker edge 17 extends into the passageway 3 and to the exterior of the head, that is, above the junction face 4. Further, the contact face 18 of the arm 17 located outside the groove juts out from the coupling face.

As a result of the above structure, in the coupled position the gaskets 19 and 20 of the coupling heads 5 and 6 compress each other in the region of their contact faces 18 and assure, by elastic return, and by reason of pressure exerted by the vehicle fluid on the extending portion of the thinner arm 16, a perfect seal of the junction.

Further, when uncoupling by traction as shown in FIG. 3, the jutting faces 18 of the gaskets 19 and 20 assist, by mutual contact and a relatively low coefficient of sliding friction, to oppose the dislodgement of the gaskets. The closer approach of the coupling faces 4 causes frictional flexing of the thinner sections 16 of the gaskets 19 and 20 causing them to bear against the flanges 13 of the grooves 12. This deformation also opposes the dislodgement of the gaskets.

Figure 4:
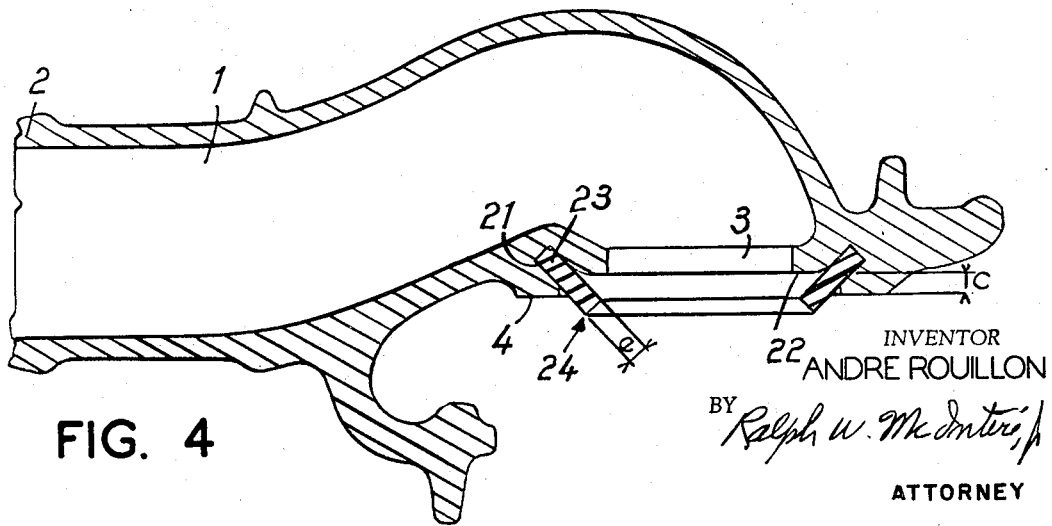
FIG. 4 is a longitudinal sectional view of a hose coupling head showing a second embodiment of the invention.

According to a second embodiment shown on FIGS. 4 to 6, a truncated annular groove 21, converging on the axis of the opening 3 and toward the exterior of the head, is machined in each of the coupling head openings in a ledge 22 machined into the junction face 4 about this passageway 3.

The groove 21 is designed to receive the peripheral flare 23 of a gasket 24 of elastic material, which, at rest, as shown in FIG. 4, has the form of a frustum of a hollow cone. Preferably, the thickness of the gasket 24 is constant and is symmetrical. However, many other forms of truncated groove and corresponding gasket may be envisioned without departing from the invention. For example, the thickness may vary if desired. Furthermore, though it may not be absolutely necessary, the gasket 24 may be reinforced by fabric 25 which preferably should not extend to the surface of opening 3.

The depth $c$ of the groove 22 is equal to the thickness $e$ of the gasket 24 but it may also be slightly greater if desired.

It results from the foregoing description that in the coupled position as shown in FIG. 5 the gaskets 26 and 27 of the two coupling heads 28 and 29 flex without touching the bottom of the grooves 22. Accordingly, the exterior faces of the free edges 30 and 31 of the gaskets are in contact and assure by reason of elastic return and the effect of pressure exerted by the vehicle fluid on the interior surfaces of said free edges 30 and 31 a perfect seal at this junction.

In addition, when uncoupling by pull apart, as shown in FIG. 6, the junction faces 4 approach each other and the gaskets 26 and 27 yield or flex further finally bearing against the bottom of the grooves 22. This deformation and the progressive incidence of the gaskets between them due to the contour favor the relative sliding action and oppose any dislodgement.

Having now described the invention, what I claim as new and desire to secure by Letters Patent is:

1. In combination, a hose coupling comprising two identical coupling halves which are joined by a combined axial and rotary motion, each of said coupling halves comprising
   (a) a hose coupling head having a fluid conduit therein opening at a face portion thereof for meeting the face portion of the coupling head of said other coupling half,
   (b) an annular groove disposed in the wall of said conduit adjacent said opening, said groove being disposed coaxially with said conduit and having a bottom and having an open top intersecting said conduit wall, said groove sloping from bottom to top convergently toward said face portion,
   (c) a flexible gasket having the configuration of a truncated hollow cone with the wide edge portion thereof being snugly received in said groove and with the narrow end portion thereof protruding beyond said face portion when the gasket is in an unstressed condition,
   (d) said conduit being widened at said face portion forming a horizontal annular ledge disposed axially inwardly of said narrow end portion of said gasket forming a seat for said narrow end portion when flexed inwardly by engagement with the face portion of the coupling head of said other coupling half,
   (e) said ledge being spaced axially inwardly from said face portion a distance at least equal to but no greater than the thickness of said narrow end portion of said gasket,
   (f) said hose coupling head including locking means cooperatively engageable with the locking means on said other coupling head and operable in response to rotation of said heads in opposite directions to axially press the narrow end of said gasket into seating engagement with the narrow end of the gasket of said other head and disposing said face portions in axially spaced relationship,
   (g) said locking means including cam means operable in response to pull-apart force applied transversely to the axis of said face portion of said coupling head in one direction and said other coupling head in the opposite direction to release said locking means, during which release said face portion of said hose coupling head and said other hose coupling head are cammed into engagement and relatively slidably movable transversely of the axis of said face portions, whereby the narrow end of said gasket and said other gasket are flexed upwardly into seating engagement with the corresponding ledge to minimize the force tending to pull said gasket out of the corresponding groove.

2. The combined hose coupling as recited in claim 1, further characterized in that said gasket comprises an elastic material having a fabric reinforcement.

3. The combined hose coupling as recited in claim 1, further characterized in that said gasket is of uniform thickness throughout.

References Cited

UNITED STATES PATENTS

| 147,498 | 2/1874 | Henderson | 285 |
| 438,290 | 10/1890 | Massey | 285—68 X |
| Re. 12,902 | 12/1908 | Kilpatrick | 285—69 |
| 1,739,131 | 12/1929 | Van N. Eick | 285—67 |
| 2,639,198 | 5/1953 | Kirkham | 285 |

FOREIGN PATENTS

| 46,495 | 2/1911 | Austria. |
| 119,416 | 11/1899 | Germany. |
| 657,244 | 9/1951 | Great Britain. |

CARL W. TOMLIN, *Primary Examiner.*

RICHARD G. BERKLEY, *Assistant Examiner.*